(12) United States Patent
Tamura et al.

(10) Patent No.: US 7,457,965 B2
(45) Date of Patent: Nov. 25, 2008

(54) UNAUTHORIZED ACCESS BLOCKING APPARATUS, METHOD, PROGRAM AND SYSTEM

(75) Inventors: Naohiro Tamura, Kawasaki (JP); Takuya Habu, Kawasaki (JP); Mayuko Morita, Kawasaki (JP); Osamu Koyano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 770 days.

(21) Appl. No.: 10/898,749

(22) Filed: Jul. 26, 2004

(65) Prior Publication Data
US 2005/0198519 A1 Sep. 8, 2005

(30) Foreign Application Priority Data
Mar. 5, 2004 (JP) ............................. 2004-062361

(51) Int. Cl.
*G06F 9/00* (2006.01)
(52) U.S. Cl. .................. 713/182; 713/155; 713/161
(58) Field of Classification Search .................. 713/182, 713/155, 161
See application file for complete search history.

(56) References Cited

FOREIGN PATENT DOCUMENTS

| JP | 2003-283554 | 10/2003 |
|---|---|---|
| JP | 2003-289337 | 10/2003 |

*Primary Examiner*—Thomas R Peeso
(74) *Attorney, Agent, or Firm*—Greer, Burns & Crain, Ltd.

(57) ABSTRACT

This invention is to minimize influence to other network by preventing unauthorized accesses such as DDoS attacks and probing by worms. When the blocking apparatuses 10*a* and 10*b* detect outbound packets by the DDoS attacks or by the probing by the worm, they carry out the Egress filtering for such outbound packets to prevent the packets relating to the unauthorized access from being sent to the backbone network 1000. Moreover, because a notice to the effect that the unauthorized access is detected is sent to other blocking apparatuses 10*c* and 10*d* via the management apparatus 16, for example, the blocking apparatuses 10*c* and 10*d* precautionarily carry out the Ingress filtering to prevent the packets relating to the unauthorized access from being sent to the network C and D.

12 Claims, 8 Drawing Sheets

|  | VALUE |
|---|---|
| AUTHORIZED SOURCE IP RANGE PREFIX | 192.168.0/8 |
| AUTHORIZED DESTINATION IP RANGE PREFIX | 10/8<br>172.16/12<br>192.168/16 |
| TCP | 80 | THRESHOLD OF NO. OF SENT PACKETS | 10 |
| | | THRESHOLD OF NO. OF SENT SOURCE IP SPOOFING PACKETS | 1 |
| | | THRESHOLD OF NO. OF DESTINATION IP ADDRESSES | 10 |
| | | THRESHOLD OF NO. OF UNAUTHORIZED DESTINATION IP ADDRESSES | 1 |
| UDP | 53 | THRESHOLD OF NO. OF SENT PACKETS | 20 |
| | | THRESHOLD OF NO. OF SENT SOURCE IP SPOOFING PACKETS | 1 |
| | | THRESHOLD OF NO. OF DESTINATION IP ADDRESSES | 25 |
| | | THRESHOLD OF NO. OF UNAUTHORIZED DESTINATION IP ADDRESSES | 1 |
| ⋮ | ⋮ | ⋮ | ⋮ |

FIG.4

UNAUTHORIZED ACCESS BLOCKING APPARATUS, METHOD, PROGRAM AND SYSTEM

TECHNICAL FIELD OF THE INVENTION

This invention relates to technology to prevent unauthorized accesses.

BACKGROUND OF THE INVENTION

Distributed Denial of Service (DDoS) attacks and computer worms have a common characteristic in which they cause to consume intentionally the network resources, such as network bandwidth, router CPUs, and server CPUs, and cause to paralyze the network infrastructure, by producing a large amount of unauthorized or unlawful traffic.

The DDoS attack is an attack to make the system stop or disable by intentionally sending processing requests whose amount exceeds the tolerance limit of the system resource, from compromised machines distributed on the network. Therefore, it has a characteristic in which the damage cannot be prevented by finding the distributed compromised machines and stopping the unauthorized or unlawful attacks from them after the simultaneous attacks start once.

Moreover, the computer worms (in the following, it is also called simply "worm".) are programs to copy itself and repeat the infection without the intervention of the computer users. The worm uses the vulnerabilities of programs executed on the host, such as buffer overflow, heap overflow, and format string, and propagates itself among computers connected with the network while self-copying. Because the speed of the worm's self-copying and spread is very fast, and it generates a large amount of traffic during the process, the worm has a characteristic in which the damage cannot be prevented by finding hosts that are infected with the worm and stopping them after they are dispersed once, as well as the DDoS attacks.

Incidentally, the spread speed of the computer worms that have been recently prevalent became very fast, and for instance, the Code Red needed no more than 12 hours for the infection to 360 thousand hosts, and furthermore, the SQL Slammer spread out all over the world during only 10 minutes. In addition, there is a tendency in which the computer worm that has been recently prevalent includes an agent program, which carries out the DDoS attacks using the infected host. The agent program is installed into the compromised machine by this computer worm and the DDoS attacks are carried out. Specifically, the Code Red included an agent program to carry out the DDoS attacks to http://www1.whitehous.gov and the Blaster included an agent program to carry out the DDoS attacks to http://www.windowsupdate.com.

The technology to deal with such DDoS attacks is described in Japanese Patent Publication 2003-283554, and 2003-2892337. However, the technology disclosed in these Japanese Patent Publications detects the DDOS attacks from inbound packets to a specific network, and cannot deal with a case in which the DDoS attacks are carried out from the specific network, in any way, thereby there is possibility to damage other networks.

For example, as shown in FIG. 1, a backbone network 1000 is connected with a network A via a blocking apparatus 1001, network B via a blocking apparatus 1002, network C via a blocking apparatus 1003, and network D via a blocking apparatus 1004. In such a state, it assumes that computers infectedwiththecomputerwormsorcomputerswhicharecompromisedmachines for the DDoS attacks exist in the networks A and B. In the background art, because the blocking apparatuses 1001 and 1002 do not check any outbound packets from the network A or B connected with itself, packets by the DDoS attacks or packets for probing by the worms are sent out to the backbone network 1000. Therefore, the congestion occurs in the backbone network 1000. On the other hand, when the blocking apparatuses 1003 and 1004 respectively connected with the networks C and D, which are attack targets or infection destinations, detect the packets by the DDoS attacks and/or packets for probing among the inbound packets to the networks C and D, they carry out filtering of the packets by the DDoS attacks and/or packets for probing to prevent them from being sent to the networks C and D.

Incidentally, although there is a word "computer virus" similar to the "computer worm", the computer virus is a program to infect computers via the user's intervention and is distinct from the computer worm, here. It is a camouflage program to cause subversive activities when the computer user instructs to execute without knowing its harmful effects, such as files attached to e-mail, and files linked from Hyper Text Markup Language (HTML) files. The spread speed of the computer virus is slower than that of the computer worm, and the technology to detect and quarantine the computer virus by a signature-type anti-virus software executed at clients or servers is already established. Therefore, this invention does not mention it hereafter.

As described above for the background arts, there are various problems in the method in which only the inbound traffic from the backbone network is monitored at the boundary with the backbone network to carry out the countermeasure. That is, in the DDoS attacks, although the network including the target server is protected by blocking the inbound traffic at the boundary with the backbone network, it is impossible to stop the DDoS attacks. Therefore, the backbone network bandwidth and the resource of the routers in the backbone network are consumed, and the legitimate communication is prevented. In addition, in the worm spread, it may be possible to protect the invasion of the worm from the backbone network by blocking the inbound traffic at the boundary with the backbone network. However, because it is impossible to stop the probing to search new infection destinations by the computers infected with the worm, the backbone network bandwidth and the resource of the routers in the backbone network are consumed, and the legitimate communication is prevented.

Moreover, even if in an ideal environment, the inbound traffic can be completely blocked in all of the networks connected with the backbone network, the worm may invade from portable devices, such as a notebook-type personal computer, into the networks, and in reality, the spread of the worm into the backbone network cannot be avoidable.

SUMMARY OF THE INVENTION

Therefore, an object of this invention is to provide new technology to suppress influences to other networks by blocking unauthorized or unlawful accesses such as the DDoS attacks and propagation of the worms.

An unauthorized access blocking method according to a first aspect of the invention comprises: checking an outbound packet to other networks from a first network, and judging whether or not the outbound packet fulfills a predetermined condition; and if it is judged that the outbound packet fulfills the predetermined condition, carrying out a setting to stop a packet output to other networks from the first network based on data concerning the outbound packet which was judged to fulfill the predetermined condition. Thus, because the filtering is carried out on a basis of the outbound packets to other networks, the influence to other networks can be minimized.

Incidentally, the aforementioned predetermined condition may include at least one of: a first condition to detect a packet to be regarded as a distributed denial of service attack, and a second condition to detect a packet to be regarded as a probing by a computer worm.

Furthermore, the aforementioned first condition may include at least one of: the number of sent packets per unit time period for each packet identified by a combination of a packet type, destination IP address and destination port number, and the number of packets including a spoofed source IP address. These are parameters representing characteristics of the packets by the DDoS.

Furthermore, the aforementioned second condition may include at least one of: the number of destination IP addresses per unit time period for each packet identified by a combination of a packet type and destination port number, and the number of packets including an unauthorized destination IP address. These are parameters representing characteristics of probing packets by the worms.

In addition, the unauthorized access blocking method according to the first aspect of the invention may further comprise, if it is judged that the outbound packet fulfills the predetermined condition, transmitting data as to the outbound packet which was judged to fulfill the predetermined condition to another device (for example, a management apparatus or other unauthorized access blocking apparatuses). Even if the unauthorized access is detected, the outputs of all of the packets relating to the unauthorized accesses may not be necessarily prevented. Therefore, by notifying other apparatuses of the detection of the unauthorized access, it becomes possible to deal with the unauthorized accesses by another countermeasure.

Furthermore, the unauthorized access blocking method according to the first aspect of the invention may further comprises, if a notice concerning the detection of the unauthorized access is received from other device, carrying out a setting for a filtering process for inbound packets to the first network from other networks based on the notice concerning the detection of the unauthorized access. Thus, a precautionary filtering of the inbound packets can be carried out.

In addition, the carrying out the setting for the filtering process may include, if the notice concerning the detection of the unauthorized access includes a specific IP address, judging whether or not the specific IP address is related to the first network. This is because, if the specific IP address, which does not relate to the first network, is an attack target, there is no need to carry out the filtering.

An unauthorized access blocking apparatus according to a second aspect of this invention comprises: a judging unit that checks an outbound packet to other networks from a first network, and judges whether or not the outbound packet fulfills a predetermined condition; and a setting unit that carries out a setting to stop a packet output to other networks from the first network based on data concerning the outbound packet which was judged to fulfill the predetermined condition if it is judged that the outbound packet fulfills the predetermined condition. This unauthorized access blocking apparatus may be a network device such as a switch, and may be a computer and the like connected with the network device.

An unauthorized access blocking system according to a third aspect of this invention comprises: a management apparatus; and a plurality of unauthorized access blocking apparatuses, each having a judging unit that checks an outbound packet to other networks from a first network, and judges whether or not the packet fulfills a predetermined condition; a setting unit that carries out a setting to stop a packet output to other networks from the first network based on data concerning the outbound packet which was judged to fulfill the predetermined condition, if it is judged that the outbound packet fulfills the predetermined condition; a unit that transmits data as to the outbound packet which was judged to fulfill the predetermined condition to the management apparatus, if it is judged that the outbound packet fulfills the predetermined condition; and a unit that carries out, if a notice concerning detection of the unauthorized access is received from the management apparatus, a setting for a filtering process for inbound packets to the first network from other networks based on the notice concerning the detection of the unauthorized access, and wherein the management apparatus comprises a unit that transmits said notice concerning the detection of the unauthorized access to the unauthorized access blocking apparatuses other than a specific unauthorized access blocking apparatus if data as to the packet which was judged to fulfill the predetermined condition is received from the specific unauthorized access blocking apparatus. Thus, it is possible to deal with the unauthorized access by the combination of the plurality of unauthorized access blocking apparatuses and the management apparatus. Incidentally, it is also possible to adopt a configuration without the management apparatus in the network.

Incidentally, the aforementioned unauthorized access blocking method may be executed by a combination of a computer and program, and in such a case, the program is stored on a storage medium or storage device, such as a flexible disk, CD-ROM, magneto-optic disk, semiconductor memory, and hard disk. In addition, it may be distributed as a digital signal via a network. Incidentally, the intermediate processing result is temporarily stored in a storage device such as a memory.

BRIEF DESCRIPTION OF THE DRAWINGS

FIG. 4 is a diagram showing an example of data stored in the definition file;

DETAILED DESCRIPTION OF THE PREFERRED EMBODIMENTS

An Outline of an Embodiment in this Invention

Figure 1:
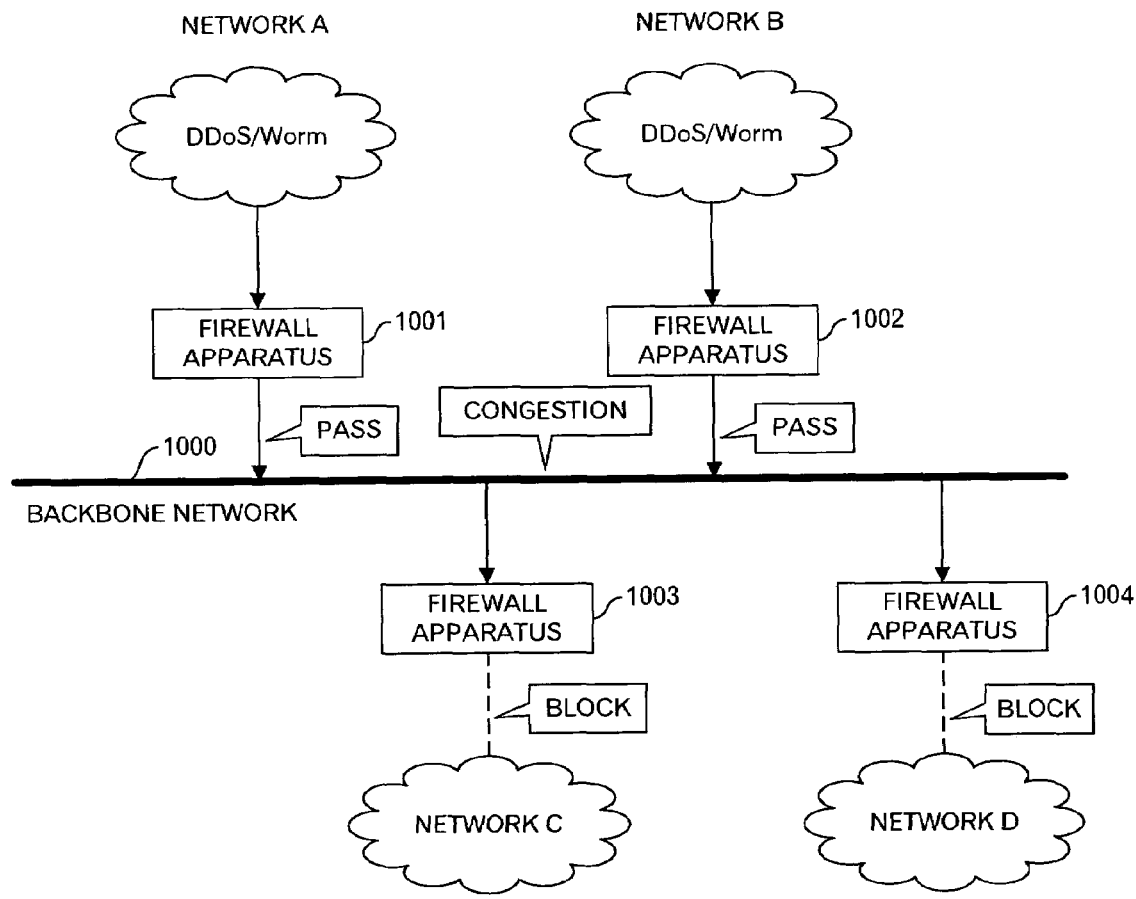
FIG. 1 is a diagram to explain the background art.
Figure 2:
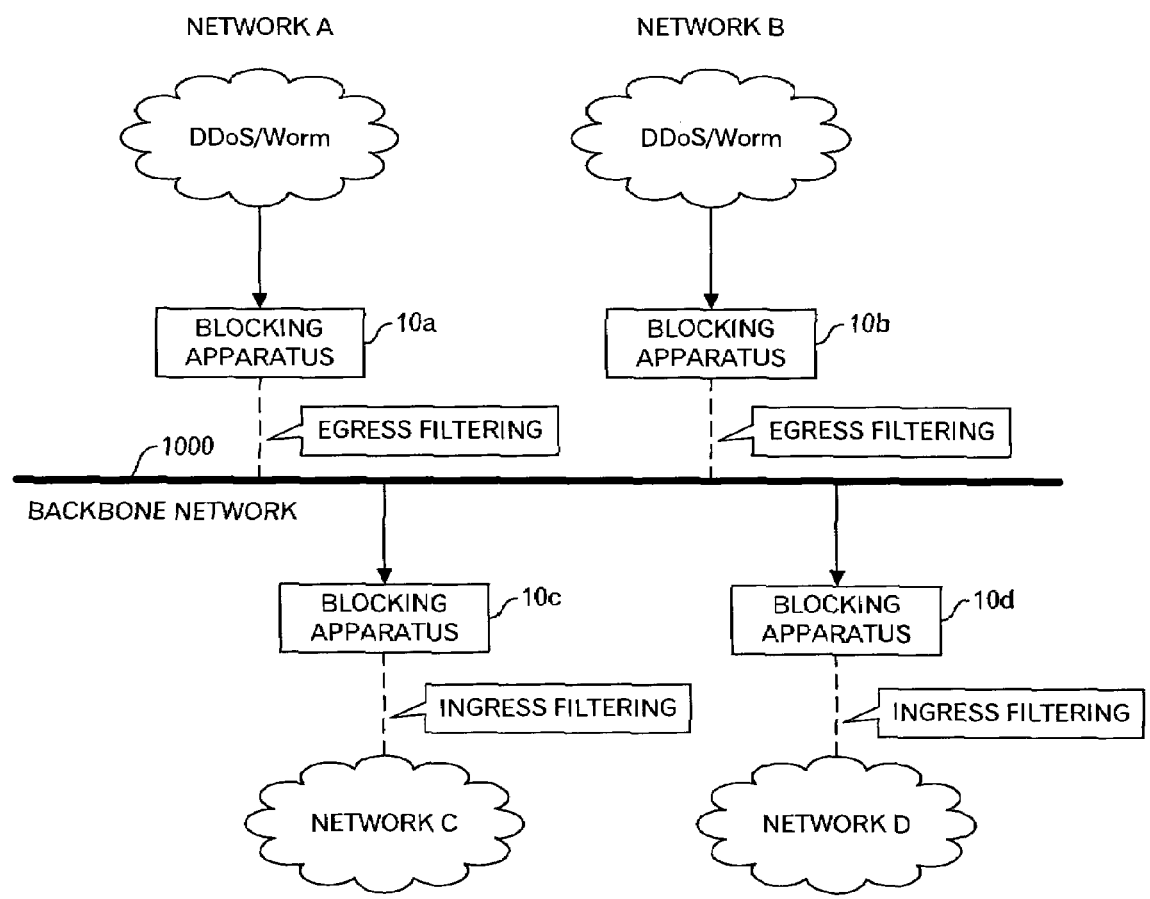
FIG. 2 is a diagram to explain an outline of an embodiment of the invention.

FIG. 2 shows an outline of an embodiment in this invention. In FIG. 2, a backbone network 1000 is connected with a network A via a blocking apparatus 10*a*, a network B via a blocking apparatus 10*b*, a network C via a blocking apparatus 10*c*, and a network D via a blocking apparatus 10*d*. And, as well as FIG. 1, it is assumed that computers, which are sources of the DDoS attacks, or computers infected with the worm are connected with the networks A and B. In this embodiment, when the blocking apparatuses 10a and 10b detect outbound packets by the DDoS attacks and/or outbound packets for the probing by the worms, the Egress filtering is carried out for such outbound packets not to send out the packets relating to the unauthorized access to the backbone network 1000. In addition, because a notice to the effect that the unauthorized access was detected is transmitted to other blocking apparatuses 10c and 10d via a management apparatus (not shown), for example, the Ingress filtering is precautionarily carried out in the blocking apparatuses 10c and 10d not to send out packets relating to the unauthorized access to the networks C and D.

Thus, at the boundary with the backbone network 1000 (that is, the blocking apparatuses 10a to 10d), it is possible to detect the outbound traffic of the unauthorized accesses caused by the DDoS attacks and/or probing by the worms from the networks A or B to the backbone network 1000, and to protect any inflow of the unauthorized traffic to the backbone network 1000. Therefore, the congestion of the backbone network 1000 does not happen, and the processing ability of routers in the backbone network 1000 is not disabled.

In addition, even if DDoS agents invade into the networks A or B connected with the backbone network 1000 at the worst, the DDoS attacks can be annulled, because the outflow of the packets relating to the DDoS attacks to the backbone network 1000 can be quickly blocked.

Furthermore, even if any computers in the network A or B connected with the backbone network 1000 infect with the worm at the worst, the infection expansion of the worm is protected, because the outflow of the worm to the backbone network 1000 can be blocked without any time lag.

Furthermore, in a case where the unauthorized access is detected at the networks A and B connected with the backbone network 1000, because the precautionary countermeasure is carried out so that the unauthorized accesses to other networks C and D connected with the backbone network 1000 are not carried out, the reliability for the protection against the unauthorized accesses is improved.

Incidentally, the backbone network 1000 in this embodiment is a backbone network in a company, for example, and the network is a network in each department and/or branch office, for example. In addition, the backbone network 1000 may be a backbone network in the Internet Service Provider (ISP), and in such a case, the network is a network for each customer group (for example, network for the government or local government, customer company network, or individual user network).

[Specific Configuration of the Embodiment in this Invention]

Figure 3:
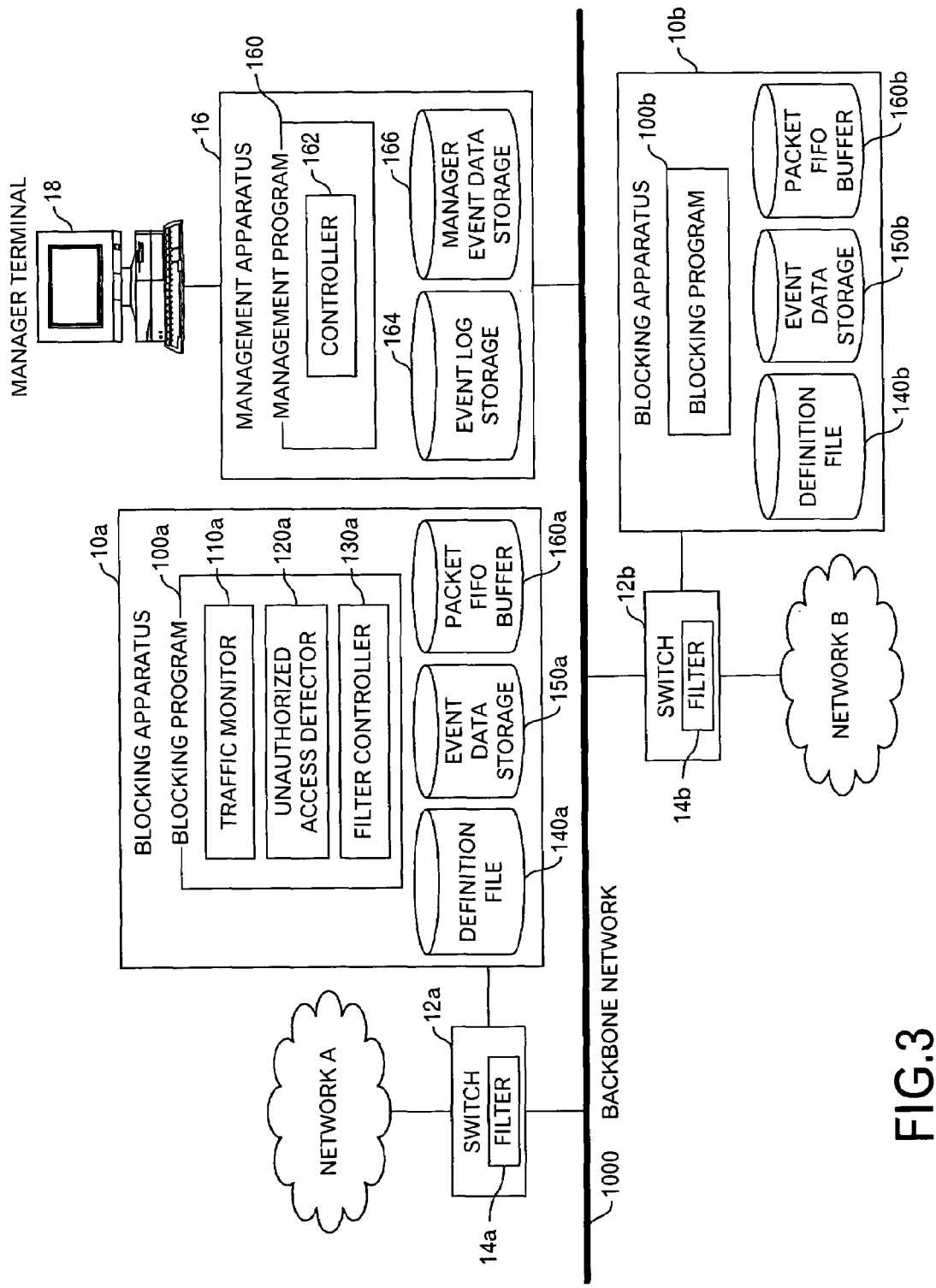
FIG. 3 is a diagram showing a system outline according to the embodiment of the invention.

FIG. 3 shows a functional block diagram of a system according to this embodiment. In an example of FIG. 3, the backbone network 1000 is connected with switches 12a and 12b, and a management apparatus 16. The switch 12a is connected with the blocking apparatus 10a via a mirror port. The switch 12b is also connected with the blocking apparatus 10b via a mirror port. Furthermore, the switch 12a is connected with the network A, and the switch 12b is connected with the network B. The management apparatus 16 is connected with a manager terminal 18 such as a personal computer. Incidentally, the numbers of networks and switches connected with the backbone network 1000 are arbitrary.

The switch 12a includes a filter 14a realizing an Egress filter against the outbound traffic to the backbone network 1000 from the network A and an Ingress filter against the inbound traffic to the network A from the backbone network 1000. The switch 12b also includes a filter 14b realizing an Egress filter against the outbound traffic to the backbone network 1000 from the network B, and an Ingress filter against the inbound traffic to the network B from the backbone network 1000.

The blocking apparatus 10a executes a blocking program 100a and manages a definition file 140a, event data storage 150a, and packet First In First Out (FIFO) buffer 160a. The blocking apparatus 10b also executes a blocking program 100b, and manages a definition file 140b, event data storage 150b, and packet FIFO buffer 160b. In addition, the blocking program 100a includes a traffic monitor 110a, unauthorized access detector 120a, filter controller 130a, data storage (not shown) such as files, and IO controller (not shown) to communicate data with the switch 12a. Furthermore, although it is not shown in FIG. 3, the blocking program 100b also has the similar processing modules.

The management apparatus 16 executes a management program 160 including a controller 162, and manages an event log storage 164 and manager event data storage 166.

For example, the outbound packets to the backbone network 1000 from the network A are output not only to the backbone network 1000 but also the blocking apparatus 10a. The blocking apparatus 10a carries out processings described below and makes the filter 14a of the switch 12a carry out the Egress filtering when detecting the unauthorized access. At this time, the definition file 140a, event data storage 150a, and packet FIFO buffer 160a are used. In addition, when detecting the unauthorized access, a notice to the effect that the unauthorized access was detected is also sent to the management apparatus 16. The management program 160 of the management apparatus 16 notifies the manager terminal 18 of the detection of the unauthorized access, and notifies blocking apparatuses (for example, blocking apparatus 10b) other than the blocking apparatus, which notified the detection of the unauthorized access. The blocking apparatus 10b, which was notified of the detection of the unauthorized access, makes the filter 14b of the switch 12b carry out the Ingress filtering. Moreover, when the cancel of the countermeasure against the unauthorized access is instructed by an administrator operating the manager terminal 18, the management program 160 transmits a notice of the cancel of the countermeasure against the unauthorized access to the blocking apparatuses. Each blocking apparatus, which receives the notice of the cancel of the countermeasure against the unauthorized access, instructs the switches 12a and 12b to stop the Egress filtering or Ingress filtering.

FIG. 4 shows an example of the definition file 140a. A table shown in FIG. 4 includes a line for an authorized source IP address range prefix, which is indicated as "AUTHORIZED SOURCE IP RANGE PREFIX", line for an authorized destination IP address range prefix, which is indicated as "AUTHORIZED DESTINATION IP RANGE PREFIX", and line for thresholds for each combination of the packet type and destination port number, including a line for a threshold as to the number of sent packets addressed to a specific destination IP address per second, which is indicated as "THREHSHOLD OF NO. OF SENT PACKETS", line for a threshold of the number of sent source IP address spoofing packets per second, which is indicates as "THRESHOLD OF NO. OF SENT SOURCE IP SPOOFING PACKETS", line for a threshold of the number of destination IP addresses per second, which is indicates as "THRESHOLD OF NO. OF DESTINATION IP ADDRESSES", and line for a threshold of the number of unauthorized destination IP addresses per second, which is indicated as "THRESHOLD OF NO. OF UNAUTHORIZED DESTINATION IP ADDRESSES.

The reason why the authorized source IP address range prefix is registered is to confirm whether or not the alteration of the source IP address exists, because TCP-Syn packets whose source IP address is altered may be transmitted in the DDoS attacks, for example. In addition, the reason why the authorized destination IP address range prefix is registered is to confirm whether or not the transmission of packets to unauthorized destination IP addresses is tried, because the destination IP address may be randomly set to find out uninfected hosts in the probing by the worm, for example, and in such a case, an IP address which is not allowed as the destination IP address may be designated.

In addition, the reason why the number of sent packets addressed to a specific destination IP address per second is counted is to detect the DDoS attacks by those packets because a lot of packets addressed to the specific IP address is sent within a predetermined time period in a case of the DDoS attacks. Therefore, following processings are carried out; 1) categorizing sent packets for each combination of the packet type, destination port number and destination IP address, 2) generating a histogram for each combination of the packet type, destination port number and destination IP address, and 3) judging based on degrees of the histogram whether or not the threshold of the sent packets addressed to the specific destination IP address per second is exceeded.

In addition, the reason why the number of sent source IP address spoofing packets per second is counted is to detect the DDoS attacks by this count, because there is a case where the source IP address is spoofed in a case of the DDoS attacks as described above. In a case where the spoofing of the source IP address is detected, the number of packets is counted for each combination of the packet type and destination port number, and it is judged based on the count whether or not the threshold of the number of sent source IP address spoofing packets per second is exceeded.

Furthermore, the reason why the number of destination IP addresses per second is counted is to detect the existence of the worm by this parameter, because the worm sends packets to a lot of IP addresses during a short time period when it carries out the probing, for example. Therefore, following steps are carried out: that is, 1) generating a histogram for the number of kinds of the destination IP address identified by a combination of the packet type and destination port number, and 2) judging whether or not the number of kinds of the destination IP address exceeds the threshold of the number of destination IP addresses.

Furthermore, the reason why the number of the unauthorized destination IP addresses per second is counted is to detect the existence of the worm by this parameter, because the worm tries to send packets to destination IP addresses to which the access is not allowed when it carries out the probing, for example. Therefore, in a case where a packet whose destination is set to an unauthorized destination IP address is detected, the number of destination IP addresses is counted for each combination of the packet type and destination port number, and it is judged based on the count whether the threshold of the number of unauthorized destination IP addresses per second is exceeded.

In the example of FIG. 4, the thresholds for the packet type TCP and destination port number 80, and thresholds for the packet type UDP and destination port number 53 are specifically shown. However, the combinations of other packet type and destination port number can be also defined in the definition file 140*a*.

Next, processing flows by each processing modules shown in FIG. 3 will be explained using FIGS. 5 to 8. In this embodiment, the same processing is carried out in all of the blocking apparatuses, and the traffic monitor, unauthorized access detector and filter controller of the blocking program in the blocking apparatus respectively carry out their processing, asynchronously. Therefore, processing flows of the traffic monitor 110*a*, unauthorized access detector 120*a* and filter controller 130*a* of the blocking program 100*a* in the blocking apparatus 10*a* will be explained below.

Figure 5:
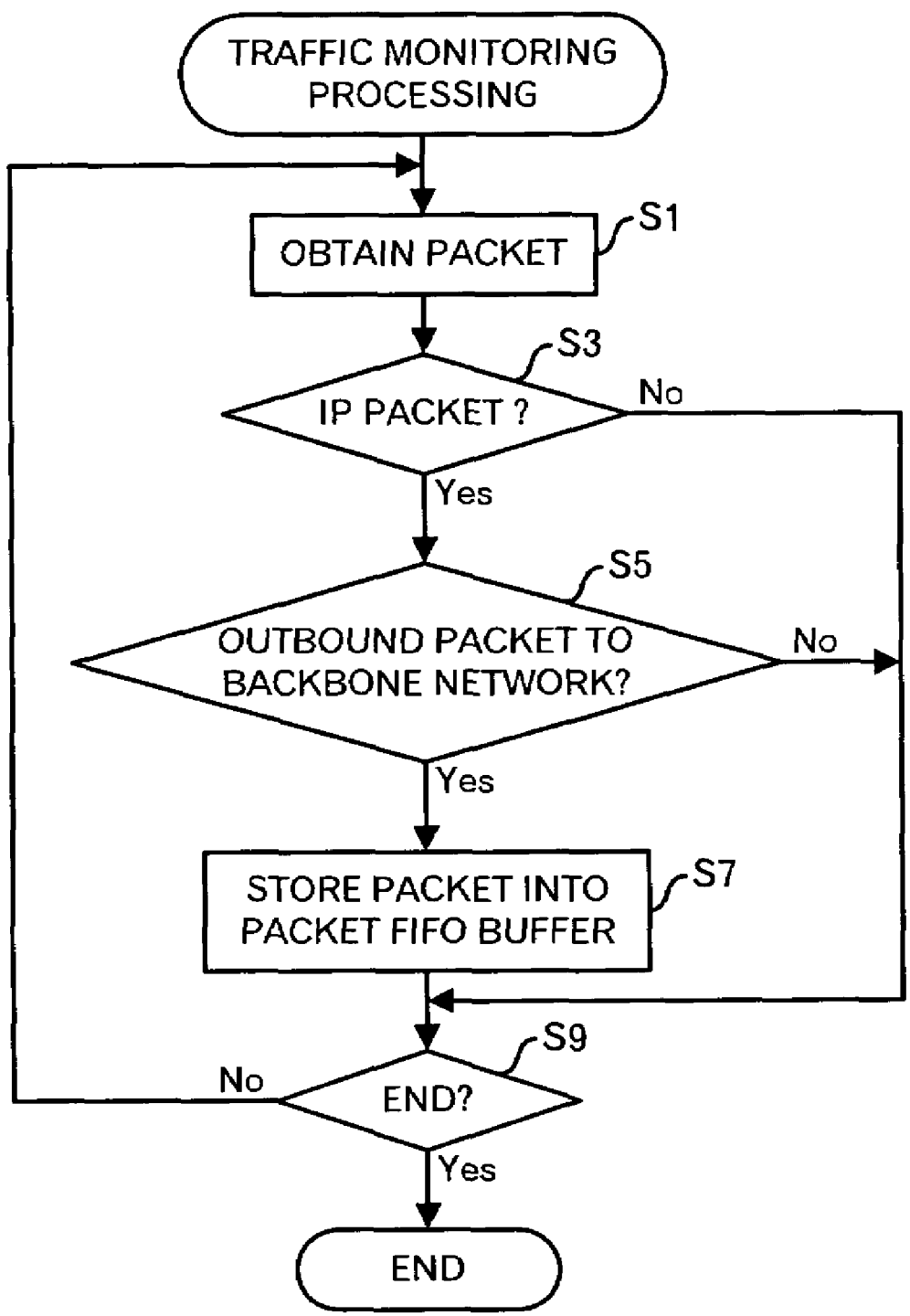
FIG. 5 is a diagram showing a processing flow of a traffic monitoring processing.

The processing of the traffic monitor 110*a* is explained using FIG. 5. The traffic monitor 110*a* obtains a packet from the switch 12*a* (step S1), and judges whether or not this packet is an IP packet (step S3). If it is not an IP packet, the processing shifts to step S9. On the other hand, if it is an IP packet, it judges whether or not it is an outbound packet to the backbone network 1000 (step S5). If it is not an outbound packet, the processing shifts to the step S9. On the other hand, if it is an outbound packet, the traffic monitor 110*a* stores this packet into the packet FIFO buffer 160*a* (step S7). Incidentally, it also registers data of date and time with the packet data. Moreover, it is also possible to store only the packet header, because only the packet header is used in the following processing. It repeats such steps S1 to S7 until the processing ends.

Thus, the traffic monitor 110*a* carries out a pre-processing for the blocking program 100*a*.

Figure 6:
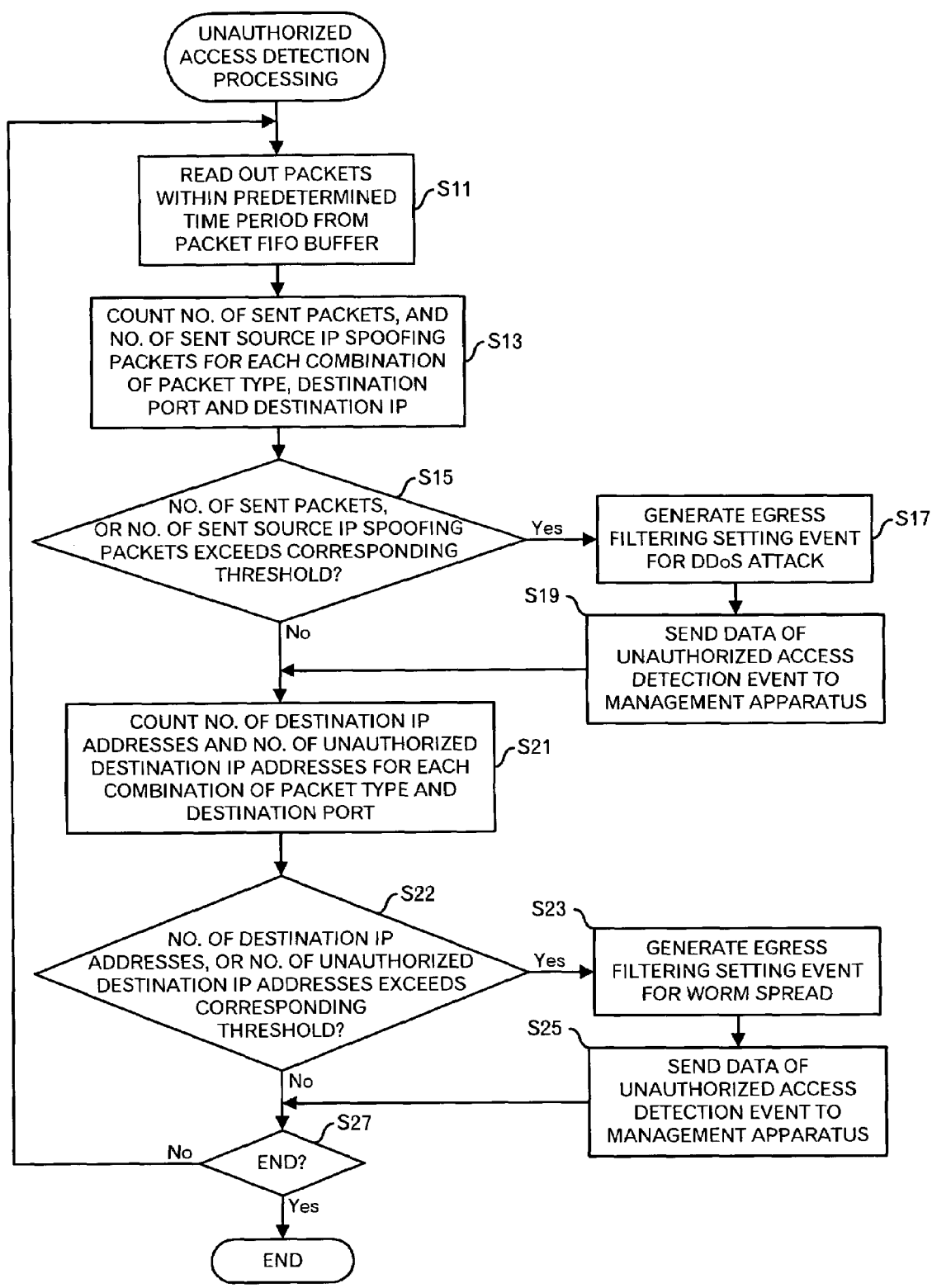
FIG. 6 is a diagram showing a processing flow of an unauthorized access detection processing.

Next, the processing of the unauthorized access detector 120*a* is explained using FIG. 6. The unauthorized access detector 120*a* reads out packets within a predetermined time period (for example, 10 seconds) from the packet FIFO buffer 160*a* (step S11). Then, it counts the number of sent packets and number of sent source IP address spoofing packets for each combination of the packet type (i.e. protocol type), destination port number and destination IP address, and stores them into a storage device such as a main memory (step S13). Incidentally, the packet type includes ICMP, TCP-Syn, UDP and etc. The port number of ICMP is "0".

Here, it refers to the definition file 140*a*, and reads out the thresholds of the number of sent packets, and thresholds of the number of sent source IP address spoofing packets, both of which are specified by the corresponding packet type and destination port number, and respectively compares the numbers of sent packets and numbers of sent source IP address spoofing packets, which are counted at the step S13, with the corresponding thresholds. Then, it judges for each packet identified by the combination of the packet type, destination port number and destination IP address, whether or not the number of sent packets exceeds the corresponding threshold or the number of sent source IP address spoofing packets exceeds the corresponding threshold (step S15). As for each packet identified by the combination of the packet type, destination port number and destination IP address and whose number of sent packets exceeds the corresponding threshold, and each packet identified by the combination of the packet type, destination port number and destination IP address and whose number of sent source IP address spoofing packets exceeds the corresponding threshold, it generates an Egress filtering setting event for the DDoS attack, and stores the Egress filtering setting event into the event data storage 150*a* (step S17). The Egress filtering setting event for the DDoS attack includes data concerning the packet judged to exceed the threshold (here, the packet type, port number and destination IP address). In addition, it transmits data of the unauthorized access detection event via the switch 12*a* and backbone network 1000 to the management apparatus 16 (step S19). The data of the unauthorized access detection event includes data of the packet judged to exceed the threshold.

In a case where there is no packet judged at the step S15 to exceed the corresponding threshold, or after the step S19, it counts the number of destination IP addresses and number of unauthorized destination IP addresses for each packet identified by the combination of the packet type (i.e. protocol type) and the destination port number by using the packet data read out at the step S11 (step S21).

Here, by referring to the definition file 140a, it reads out the thresholds of the number of destination IP addresses and thresholds of the number of unauthorized destination IP addresses, both of which are specified by the corresponding packet type and destination port number, and respectively compares the numbers of destination IP addresses and numbers of unauthorized destination IP addresses, which are counted at the step S21, with the corresponding thresholds. Then, it judges for each packet identified by the combination of the packet type and destination port number, whether or not the number of destination IP addresses exceeds the corresponding threshold, or the number of unauthorized destination IP addresses exceeds the corresponding threshold (step S22). As for each packet identified by the combination of the packet type and destination port number and whose number of destination IP addresses exceeds the corresponding threshold, and each packet identified by the combination of the packet type and destination port number and whose number of unauthorized destination IP addresses exceeds the corresponding threshold, it generates an Egress filtering setting event for the countermeasure against the worm spread, and stores the Egress filtering setting event into the event data storage 150a (step S23). The Egress filtering setting event for the countermeasure against the worm spread includes data concerning the packet judged to exceed the threshold (here, the packet type and destination port number). In addition, it transmits data of the unauthorized access detection event via the switch 12a and backbone network 1000 to the management apparatus 16 (step S25). The data of the unauthorized access detection event includes data (here, the packet type and destination port number) of the packet judged to exceed the threshold.

Thus, the traffic monitor 110a detects the DDoS attacks and worm infections, and notifies the management apparatus 16 of this event.

Figure 7:
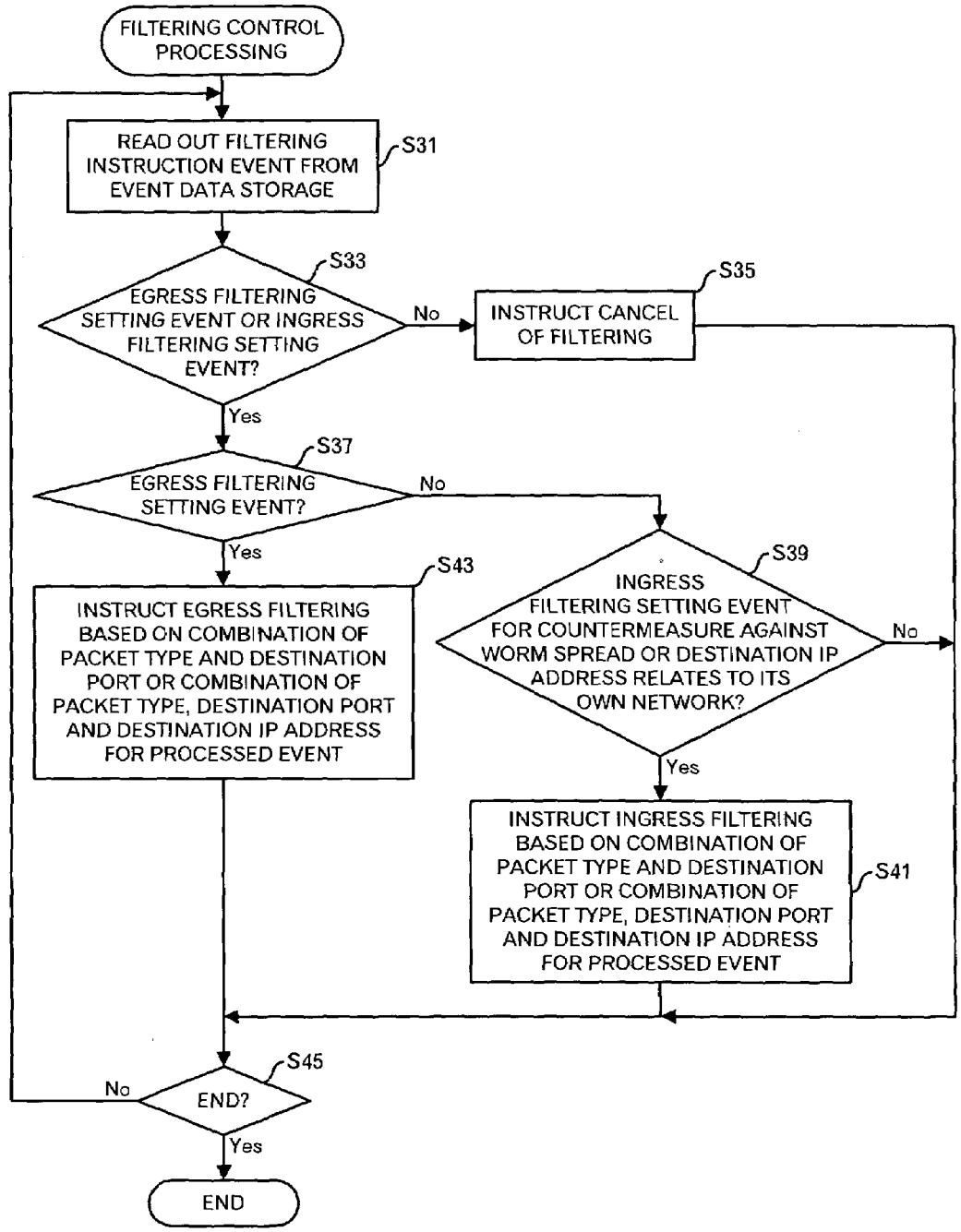
FIG. 7 is a diagram showing a processing flow of a filter control processing.

Next, the filter control processing by the filter controller 130a is explained using FIG. 7. Incidentally, although not shown, the blocking program 100a stores data of a filtering instruction event received from the management apparatus 16 into the event data storage 150a as the background processing. Firstly, the filter controller 130a reads out the filtering instruction event from the event data storage 150a (step S31). The filtering instruction event includes the Ingress filtering setting event and filtering cancel event notified from the management apparatus 16 as well as the aforementioned Egress filtering setting event for the DDoS attacks and for the worm spread. The Ingress filtering setting event is notified from the management apparatus 16 to precautionarily carry out the Ingress filtering when an event at which the Egress filtering is carried out in other blocking apparatus occurred. In addition, the filtering cancel event occurs when the administrator who confirms that the packets for the DDoS attacks and/or for the worm spread are not transmitted instructs the cancel of the filtering after any countermeasure has been carried out for computers which carry out the DDoS attacks, and/or computers which infects with the worms. If there is no unprocessed event in the event data storage 150a, it waits.

Then, the filter controller 130a judges whether or not the read filtering setting event is an Egress filtering setting event or Ingress filtering setting event (step S33). If it is neither Egress filtering setting event nor Ingress filtering setting event, it is a filtering cancel event. Therefore, the filter controller 130a instructs the filter 14a in the switch 12a to cancel the filtering based on the data of the filtering cancel event (step S35). For example, the filtering cancel event includes data of the packet type, port number and destination IP address in a case of the countermeasure against the DDoS attack, and data of the packet type and port number in a case of the countermeasure against the worm spread. Incidentally, after the step S33, the processing shifts to step S45.

On the other hand, when it is either Egress filtering setting event or Ingress filtering setting event, it judges whether or not it is the Egress filtering setting event (step S37). If it is the Egress filtering setting event, the filter controller 130a instructs the filter 14a in the switch 12a to carry out the Egress filtering based on the packet type and destination port number relating to the event, or based on the packet type, destination port number and destination IP address relating to the event (step S43). That is, in a case of the countermeasure against the DDoS attack, it carries out a setting to stop the transmission of the outbound packets whose packet type, destination IP address and destination port number are identical to the packet type, destination IP address and destination port number relating to the event. In addition, in a case of the countermeasure against the worm spread, it carries out a setting to stop the transmission of the outbound packets whose packet type and port number is identical to the packet type and port number relating to the event. After the step S43, the processing shifts to the step S45.

If it is judged at the step S37 that it is not the Egress filtering setting event but the Ingress filtering setting event, the filter controller 130a judges whether or not it is the Ingress filtering setting event for the worm spread or whether or not the destination IP address is within an IP address range of its own network (here, the network A) in a case of the Ingress filtering setting event for the DDoS attack (step S39). If the destination IP address is not within the IP address range of its own network in a case of the Ingress filtering setting event for the DDoS attack, the processing shifts to the step S45, because its own network is not a target of the attack and there is no need to carry out the Ingress filtering. On the other hand, if it is the Ingress filtering setting event for the worm spread or if the destination IP address is within the IP address range of its own network (here, the network A) in a case of the Ingress filtering setting event for the DDoS attack, the filter controller 130a instructs the filter 14a in the switch 12a to carry out the Ingress filtering based on the packet type and destination port number or based on the packet type, destination port number and destination IP address, which are included in the Ingress filtering setting event (step S41). That is, in a case of the countermeasure against the DDoS attack, a setting is carried out to stop the transmission of the inbound packets meeting the packet type, destination IP address and destination port number relating to the event. In addition, in a case of the countermeasure against the worm spread, a setting is carried out to stop the transmission of the inbound packets meeting the packet type and destination port number. After the step S43, the processing shifts to the step S45.

At the step S45, the filter controller 130a judges whether or not the processing should be ended, and in a case where the processing is to be continued, the processing returns to the step S31. In the other cases, the processing ends. Incidentally, the unprocessed filtering instruction event in the event data storage 150a can be identified by setting a processed flag when the processing is completed, deleting the data of the processed filtering instruction event when the processing is completed, or the like.

Thus, by controlling the filter 14a in the switch 12a, it becomes possible to effectively deal with the DDoS attacks and the worm.

Figure 8:
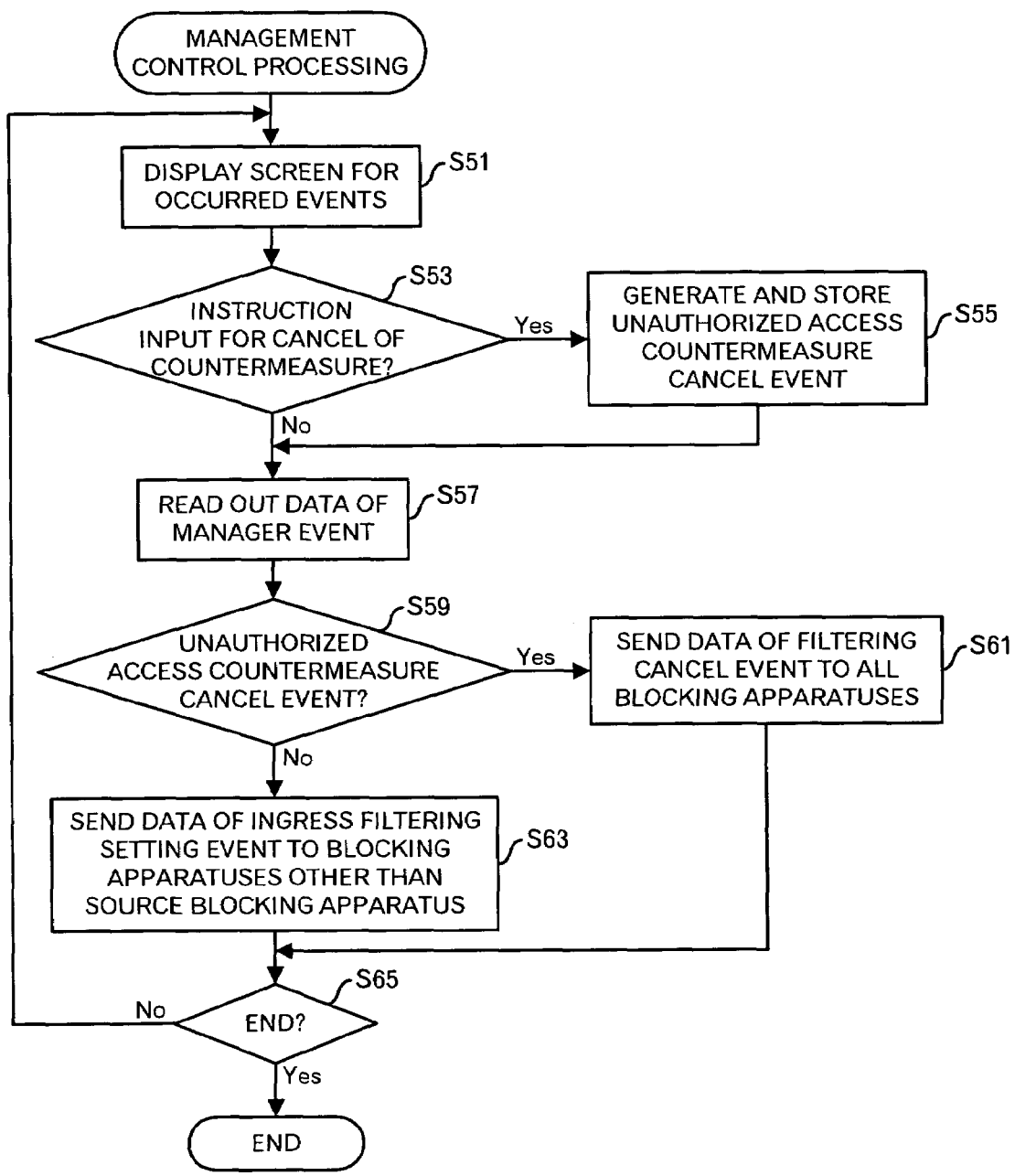
FIG. 8 is a diagram showing a processing flow of a management control processing.

Next, a processing of the management program 160 in the management apparatus is explained using FIG. 8. Incidentally, although it is not shown in figures, the management program 160 receives data of the unauthorized access detection event via the backbone network 1000, and stores it into the event log storage 164 and manager event data storage 166, as a background processing. Then, the management program 160 generates a screen data to display a newly occurred event when data of the newly occurred event is stored into the event log storage 164, and makes the manager terminal 18, for example display the screen by transmitting the screen data to the manager terminal 18 (step S51). Incidentally, it is possible to generate and transmit a Hyper Text Markup Language (HTML) file according to the well-known web base technology, and it is also possible to generate and transmit display data for a special program.

The screen displayed on a display device of the manager terminal 18 includes, for example, a list of the occurred events, and in the list, an event occurred at this time is displayed with emphasis. In addition, the display of each occurred event includes an indication representing whether or not the cancel of the countermeasure is carried out and countermeasure cancel button. The administrator of the manager terminal 18 refers to contents displayed on the display device of the manager terminal 18, and takes any necessary actions. For example, when the DDoS attacks occurs in a specific network, the DDoS attack is stopped, and when the probing by the worm is detected, the quarantine of the worm is carried out. If the necessary action is completed and it is confirmed that the network returns to the normal state, when the administrator clicks the countermeasure cancel button corresponding to the occurred event, the manager terminal 18 outputs a countermeasure cancel instruction to the controller 162 in the manager program 160 of the manager apparatus. The controller 162 receives an input of the countermeasure cancel instruction from the manager terminal 18 (step S53), and generates the unauthorized access countermeasure cancel event by using data of the occurred event, and stores it into the event log storage 164 and manager event data storage 166 (step S55).

In addition, regardless of the existence of the countermeasure cancel instruction for the occurred event, the controller 162 reads out data of a manager event by referring to the manager event data storage 166 (step S57). The manager event includes the unauthorized access detection event (for the DDoS attack and for the worm spread) received from the blocking apparatus as well as the aforementioned unauthorized access countermeasure cancel event. Then, the controller 162 judges whether or not the read manager event is the unauthorized access countermeasure cancel event (step S59). If the controller 162 judges that it is the unauthorized access countermeasure cancel event, it transmits data of the filtering cancel event to all of the blocking apparatuses via the backbone network 1000 (step S61).

On the other hand, if the controller 162 does not judge that it is the unauthorized countermeasure cancel event, it is the unauthorized access detection event. Therefore, the controller 162 generates data of the Ingress filtering setting event based on the data included in the unauthorized access detection event, and transmits the data of the Ingress filtering setting event to the blocking apparatuses other than its source blocking apparatus (step S63).

The processing from the steps S51 to S63 is repeated until the processing ends (step S65). Incidentally, the unprocessed data of the manager event in the manager event data storage 166 is identified by setting a processed flag when the processing is completed, deleting the data of the manager event when the processing is completed, or the like.

Thus, it is possible to notify each blocking apparatus of the cancel of the unauthorized access countermeasure, and it is also possible to notify apparatuses other than a specific blocking apparatus, which detects the unauthorized access, of a request for the countermeasure against the unauthorized access when the specific blocking apparatus detects the unauthorized access.

By carrying out the aforementioned processing, firstly, the congestion of the backbone network can be previously avoided, because the transmission of the unauthorized packets to the backbone network is prevented. Therefore, even if the compromised machines of the DDoS attack or computers infected with the worms appear, the damage and influence are minimized. In addition, secondly, even if a few unauthorized packets are transmitted to the backbone network, the Ingress filtering is also carried out. Therefore, it is possible to prevent the unauthorized packets from invading into other network.

Although one embodiment of the invention is described above, this invention is not limited to this embodiment. For example, FIG. 3 shows an example in which the blocking apparatus is separated from the switch. However, their functions may be integrated into one network connection device. In addition, the blocking apparatus does not have a function to notify other blocking apparatuses of the unauthorized access detection event. However, it is possible to configure it to introduce a protocol to confirm the existence of other blocking apparatuses when it is connected to the backbone network, for example, and to notify other blocking apparatuses of the unauthorized access detection event by itself when detecting the unauthorized access. At that time, the management apparatus is unnecessary.

In addition, although at the step S63, all of the unauthorized access detection event is notified to the blocking apparatuses other than its source blocking apparatus, it is possible to notify only blocking apparatus connected with the network whose address range includes the destination IP address of the DDoS attack, for example.

Furthermore, the functional blocks of the blocking program in FIG. 3 do not necessarily correspond to actual program modules, respectively.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. An unauthorized access blocking program embodied on a storage medium, wherein said unauthorized access blocking program is executed by an apparatus connecting a first network with another network and relaying packets from said first network to said another network, and said unauthorized access blocking program comprises:

checking an outbound packet to said another network from said first network, and judging whether or not said outbound packet fulfills a predetermined condition; and if it is judged that said outbound packet fulfills said predetermined condition, carrying out a setting to stop a packet output to said another network from said first network based on data concerning said outbound packet which was judged to fulfill said predetermined condition.

2. The unauthorized access blocking program as set forth in claim 1, wherein said predetermined condition includes at least one of: a first condition to detect a packet to be regarded as a distributed denial of service attack, and a second condition to detect a packet to be regarded as a probing by a computer worm.

3. The unauthorized access blocking program as set forth in claim 2, wherein said first condition includes at least one of: a number of sent packets per unit time period for each packet identified by a combination of a packet type, a destination IP address and a destination port number, and a number of packets including a spoofed source IP address.

4. The unauthorized access blocking program as set forth in claim 2, wherein said second condition includes at least one of: a number of destination IP addresses per unit time period for each packet identified by a combination of a packet type and a destination port number, and a number of packets including an unauthorized destination IP address.

5. The unauthorized access blocking program as set forth in claim 1, further comprising: if it is judged that said outbound packet fulfills said predetermined condition, transmitting data as to said outbound packet which was judged to fulfill said predetermined condition to another device.

6. The unauthorized access blocking program as set forth in claim 1, further comprising: if a notice concerning detection of an unauthorized access is received from another device, carrying out a setting for a filtering process for inbound packets to said first network from said another network based on said notice concerning the detection of the unauthorized access.

7. The unauthorized access blocking program as set forth in claim 6, wherein said carrying out the selling for the filtering process includes, if said notice concerning the detection of the unauthorized access includes a specific IP address, judging whether or not said specific IP address relates to said first network.

8. An unauthorized access blocking apparatus, wherein said unauthorized access blocking apparatus is capable of connecting a first network with another network and relaying packets from said first network to said another network, and said unauthorized access blocking apparatus comprises:

a judging unit that checks an outbound packet to said another network from said first network, and judges whether or not said outbound packet fulfills a predetermined condition; and a setting unit that carries out a selling to stop a packet output to said another network from said first network based on data concerning said outbound packet which was judged to fulfill said predetermined condition if it is judged that said outbound packet fulfills said predetermined condition.

9. The unauthorized access blocking apparatus as set forth in claim 8, further comprising: a unit that transmits data as to said outbound packet which was judged to fulfill said predetermined condition to another device, if it is judged that said outbound packet fulfilled said predetermined condition.

10. The unauthorized access blocking apparatus as set forth in claim 8, further comprising: a unit that carries out a setting for a filtering process for inbound packets to said first network from said another network based on a notice concerning detection of an unauthorized access, if said notice concerning the detection of the unauthorized access is received from another device.

11. An unauthorized access blocking system, comprises:
a management apparatus; and
a plurality of unauthorized access blocking apparatuses, each having a judging unit that checks an outbound packet to other network from a first network, and judges whether or not said outbound packet fulfills a predetermined condition; a setting unit that carries out a setting to stop a packet output to said other network from said first network based on data concerning said outbound packet which was judged to fulfill said predetermined condition, if it is judged that said outbound packet fulfills said predetermined condition; a unit that transmits data as to said outbound packet which was judged to fulfill said predetermined condition to said management apparatus, if it is judged that said outbound packet fulfilled said predetermined condition; and a unit that carries out a selling for a filtering process for inbound packets to said first network from said other network based on a notice concerning detection of an unauthorized access, if said notice concerning the detection of the unauthorized access is received from said management apparatus, and
wherein said management apparatus comprises a unit that transmits said notice concerning the detection of the unauthorized access to the unauthorized access blocking apparatuses other than a specific unauthorized access blocking apparatus if data as to said packet which was judged to fulfill said predetermined condition is received from said specific unauthorized access blocking apparatus.

12. An unauthorized access blocking method, wherein said unauthorized access blocking method is executed by an apparatus connecting a first network with another network and relaying packets from said first network to said another network, and said unauthorized access blocking method comprises:

checking an outbound packet from said first network to said another network, and judging whether or not said outbound packet fulfills a predetermined condition;

if it is judged that said outbound packet fulfills said predetermined condition, carrying out a setting to stop a packet output from said first network to said other network based on data as to said outbound packet which is judged to fulfill said predetermined condition.

* * * * *

UNITED STATES PATENT AND TRADEMARK OFFICE
CERTIFICATE OF CORRECTION

PATENT NO. : 7,457,965 B2  
APPLICATION NO. : 10/898749  
DATED : November 25, 2008  
INVENTOR(S) : Naohiro Tamura Page 1 of 1

It is certified that error appears in the above-identified patent and that said Letters Patent is hereby corrected as shown below:

In the Claims:

Col. 13, line 46, delete "selling" and insert --setting--.

Col. 14, line 26, delete "selling" and insert --setting--.

Signed and Sealed this

Seventeenth Day of March, 2009

JOHN DOLL  
*Acting Director of the United States Patent and Trademark Office*

UNITED STATES PATENT AND TRADEMARK OFFICE
CERTIFICATE OF CORRECTION

PATENT NO. : 7,457,965 B2  Page 1 of 1
APPLICATION NO. : 10/898749
DATED : November 25, 2008
INVENTOR(S) : Naohiro Tamura It is certified that error appears in the above-identified patent and that said Letters Patent is hereby corrected as shown below:

On the Patent Face:

Under "(56) References Cited" insert --USPN 6,463,155; Akiyama et al.--.

Signed and Sealed this

Second Day of June, 2009

JOHN DOLL
*Acting Director of the United States Patent and Trademark Office*